UNITED STATES PATENT OFFICE.

JOHN A. TITZEL, OF ALLEGHENY, PENNSYLVANIA, ASSIGNOR, BY DIRECT AND MESNE ASSIGNMENTS, TO HIMSELF, JAMES C. TITZEL, AND JOHN LYNCH, ALL OF SAME PLACE.

WATERPROOFING COMPOUND OR PAINT.

SPECIFICATION forming part of Letters Patent No. 266,223, dated October 17, 1882.

Application filed March 7, 1882. (Specimens.)

*To all whom it may concern:*

Be it known that I, JOHN A. TITZEL, of Allegheny, in the county of Allegheny and State of Pennsylvania, have invented a new and Improved Waterproofing Compound or Paint, of which the following is a full, clear, and exact description.

My invention consists of a new compound or mixture adapted for rendering water-proof any kind of cloth or fabric, or to be mixed with any kind of paint or varnish for rendering it tough and durable, or to be mixed with any pigment and used as a paint for covering metal or wood, or used in any place where a durable paint is required, and of the method or process of preparing the same.

In preparing my waterproofing compound or paint, I take of raw resin-oil one ounce and of vulcanized india-rubber waste one ounce and put the same together in a small still, or in a Florence flask connected with a worm, and gradually heat the oil and rubber up to about 300° Fahrenheit, or until the rubber melts and goes into solution with the oil. The contents of the still or flask are then cooled down to about 200° Fahrenheit and emptied into an evaporating-vessel and concentrated to any desired consistency, preferably down to a thick viscous mass. This mass, when cool, will be of a light-brown or drab color. To this concentrated viscous mass I add a sufficient quantity of bicarbonate of soda to neutralize or counteract the sulphur and any acid that may be contained in the vulcanized rubber, and then I add one ounce of resin and apply heat until the resin melts. I then take the mixture away from the fire and gradually add to it four ounces of benzine, with constant stirring. After the benzine has been added and the whole cooled the compound or mixture will be very fluid and of a dark-brown color, and this mixture is adapted without further preparation for rendering water-proof any fabric or cloth, which may be done by simply saturating the fabric or cloth with the mixture and allowing it to dry.

In case the mixture is to be used as a paint for coating iron, wood, or for any similar purpose, two ounces of Venetian red or other pigment is to be added and stirred into the compound after the adding of the benzine. This mixture then makes a very tough and durable paint, well adapted for protecting tin or other sheet metal, or wire may be dipped into it and nicely coated.

Before the adding of the benzine to the thick viscous mass this mass is adapted to be mixed, without further preparation, with any kind of paint or varnish, and it serves to render the paint or varnish very tough and durable.

The mixture, when used for waterproofing purposes, is very pliable, and will not cause the fabric to crack, and when mixed with any of the various pigments and spread upon any surface as a paint is very tough and durable, and will stand a high degree of heat without alteration, and is entirely unaffected by cold.

In case pure instead of vulcanized rubber is used the bicarbonate of soda will be dispensed with in the mixture; but I prefer to use vulcanized rubber, as I am thus enabled to utilize what is now a waste.

Having thus fully described my invention, I claim as new and desire to secure by Letters Patent—

A waterproofing compound formed of equal parts of raw resin-oil and vulcanized rubber in solution, and mixed with one part of resin, a neutralizer for the sulphur and acid, and four parts of benzine, as described.

JOHN A. TITZEL.

Witnesses:
CHAS. R. WIETERSHAUSEN,
GEORGE F. MOUL.